US012374170B2

(12) United States Patent
Maitre et al.

(10) Patent No.: US 12,374,170 B2
(45) Date of Patent: Jul. 29, 2025

(54) METHODS FOR INSPECTING A VEHICLE, DEVICES, AND SYSTEMS FOR THE SAME

(71) Applicant: Volvo Truck Corporation, Gothenburg (SE)

(72) Inventors: Julien Maitre, Chuzelles (FR); Yann Quibriac, Lyons (FR)

(73) Assignee: Volvo Truck Corporation, Gothenburg (SE)

( * ) Notice: Subject to any disclaimer, the term of this patent is extended or adjusted under 35 U.S.C. 154(b) by 182 days.

(21) Appl. No.: 18/327,166

(22) Filed: Jun. 1, 2023

(65) Prior Publication Data

US 2024/0013584 A1 Jan. 11, 2024

(30) Foreign Application Priority Data

Jul. 7, 2022 (EP) .................................... 22183649

(51) Int. Cl.
*G07C 5/00* (2006.01)
*G07C 5/08* (2006.01)

(52) U.S. Cl.
CPC ........... *G07C 5/008* (2013.01); *G07C 5/0808* (2013.01); *G07C 5/0825* (2013.01)

(58) Field of Classification Search
CPC ..... G07C 5/008; G07C 5/0808; G07C 5/0825
USPC ........................................................... 701/29
See application file for complete search history.

(56) References Cited

U.S. PATENT DOCUMENTS 11,544,972 B1 * 1/2023 Koch ................... G07C 5/0808
2020/0128373 A1 * 4/2020 Stevens ................... G06F 9/542
2020/0143593 A1 * 5/2020 Rudman ............... G06T 19/006
2020/0223385 A1 * 7/2020 Brozovich ............ B60R 21/013

FOREIGN PATENT DOCUMENTS

KR 20120134333 A 12/2012

OTHER PUBLICATIONS

European Search Report for European Patent Application No. 22183649.7, completed Nov. 24, 2022, 2 pages.

* cited by examiner

*Primary Examiner* — Yazan A Soofi
(74) *Attorney, Agent, or Firm* — Withrow & Terranova, PLLC

(57) ABSTRACT

A method and a system for inspecting a vehicle comprising initiating an inspection method, from a processor device of a user terminal placed near the vehicle, the user terminal comprising an augmented reality display, the processor device, and a communication interface capable of establishing a short range communications link with a communications interface of an electronic controller of the vehicle; determining the user location relative to the vehicle, using the short-range communications link established between the user terminal and the vehicle; sending, to the electronic controller of the vehicle, a request to automatically test the operation of a testable component of the vehicle, based on the determined user location; and acquiring, by the user terminal, a test result observed by the user in response to the automatic test of the testable component of the vehicle.

13 Claims, 6 Drawing Sheets

METHODS FOR INSPECTING A VEHICLE, DEVICES, AND SYSTEMS FOR THE SAME

RELATED APPLICATIONS

The present application claims priority to European Patent Application No. 22183649.7, filed on Jul. 7, 2022, and entitled "METHODS FOR INSPECTING A VEHICLE, DEVICES, AND SYSTEMS FOR THE SAME," which is incorporated herein by reference in its entirety.

TECHNICAL FIELD

The disclosure relates generally to vehicles. In particular aspects, the disclosure relates to methods for inspecting a vehicle, devices and systems for the same.

The disclosure can be applied in heavy-duty vehicles, such as trucks, buses, and construction equipment. Although the disclosure will be described with respect to a particular vehicle, the disclosure is not restricted to any particular vehicle.

BACKGROUND

Vehicles fleets are often subject to periodic inspections. Generally, a driver of a vehicle must perform a pre-trip inspection before using the vehicle, for example to make sure that the vehicle and its components are fully operational and that the vehicle is capable of successfully performing a specific trip.

SUMMARY

Inspections are often performed manually by the driver, who, using a check list, must control manually the operation of multiple components and parts of the vehicle. This has the drawback of being particularly time-intensive, costly to implement and prone to failure. The disclosure may provide improved methods and systems to facilitate pre-trip inspections of a vehicle. The inventive concept may automate, at least partially, the pre-trip inspection method, at least by using augmented-reality systems to facilitate the interaction between a user and the vehicle component(s) to be tested.

According to an aspect of the disclosure, there is provided a method for inspecting a vehicle, the method comprising:

- determining, by a processor device of a user terminal operable by a user, a location of the user relative to the vehicle,
- sending, by the user terminal, a test request to an electronic controller of the vehicle to automatically test operation of at least one vehicle component of the vehicle within the field of view of an image sensor of the user terminal, and
- acquiring, by the user terminal, a test result observed by the user in response to the requested automatic test of said at least one component of the vehicle.

In certain examples, the method further comprises comparing the acquired test result with vehicle sensor data measured by at least one sensor of the vehicle, the sensor being coupled to the tested component of the vehicle, and generating an error code if a discrepancy is detected between the acquired test result and the vehicle sensor data.

In certain examples, the error code is a preset Diagnostic Trouble Code (DTC).

In certain examples, testing the operation of at least one component of the vehicle comprises activating said component of the vehicle according to a predefined test pattern.

In certain examples, the method further comprises for choosing a testable component of the vehicle, determining the vehicle type and vehicle information based on the the acquired images and based on stored vehicle identification data, such as vehicle type, list of components of the vehicle, abilities of each component of the vehicle.

In certain examples, the method further comprises generating a log report for each inspection.

In certain examples, comparing logged reports to determine potential theft or damage to the vehicle.

In certain examples, the vehicle is an industrial vehicle, such as a truck or a cargo trailer.

In certain examples, the method further comprises receiving, by the, at least one image of a vehicle within a field of view of the camera in electronic communication with the computing device.

According to another aspect of the disclosure, there is provided a computer program product comprising program code for performing, when executed by the processor device, a method for inspecting a vehicle, the method comprising:

- determining, by a processor device of a user terminal operable by a user, a location of the user relative to the vehicle,
- sending, by the user terminal, a test request to an electronic controller of the vehicle to automatically test operation of at least one vehicle component of the vehicle within the field of view of an image sensor of the user terminal, and
- acquiring, by the user terminal, a test result observed by the user in response to the requested automatic test of said at least one component of the vehicle.

According to another aspect of the disclosure, there is provided a non-transitory computer-readable storage medium comprising instructions, which when executed by the processor device, cause the processor device to perform a method for inspecting a vehicle, the method comprising:

- determining, by a processor device of a user terminal operable by a user, a location of the user relative to the vehicle,
- sending, by the user terminal, a test request to an electronic controller of the vehicle to automatically test operation of at least one vehicle component of the vehicle within the field of view of an image sensor of the user terminal, and
- acquiring, by the user terminal, a test result observed by the user in response to the requested automatic test of said at least one component of the vehicle.

According to another aspect of the disclosure, there is provided a system for inspecting a vehicle, the system comprising a user terminal operable by a user and comprising a processor device, an image sensor and a communications interface capable of establishing a short-range communications link with a communications interface of an electronic controller of the vehicle, the user terminal being configured to:

- determining, by the processor device, a location of the user relative to the vehicle,
- sending, by the user terminal, a test request to an electronic controller of the vehicle to automatically test operation of at least one vehicle component of the vehicle within the field of view of the image sensor of the user terminal, and
- acquiring, by the user terminal, a test result observed by the user in response to the requested automatic test of said at least one component of the vehicle.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical effects and corresponding advantages.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Inspections are often performed manually by the driver, who, using a check list, must control manually the operation of multiple components and parts of the vehicle. This has the drawback of being particularly time-intensive, costly to implement and prone to failure. The disclosure may provide improved methods and systems to facilitate pre-trip inspections of a vehicle. The inventive concept may automate, at least partially, the pre-trip inspection method, at least by using augmented-reality systems to facilitate the interaction between a user and the vehicle component(s) to be tested.

Figure 1:
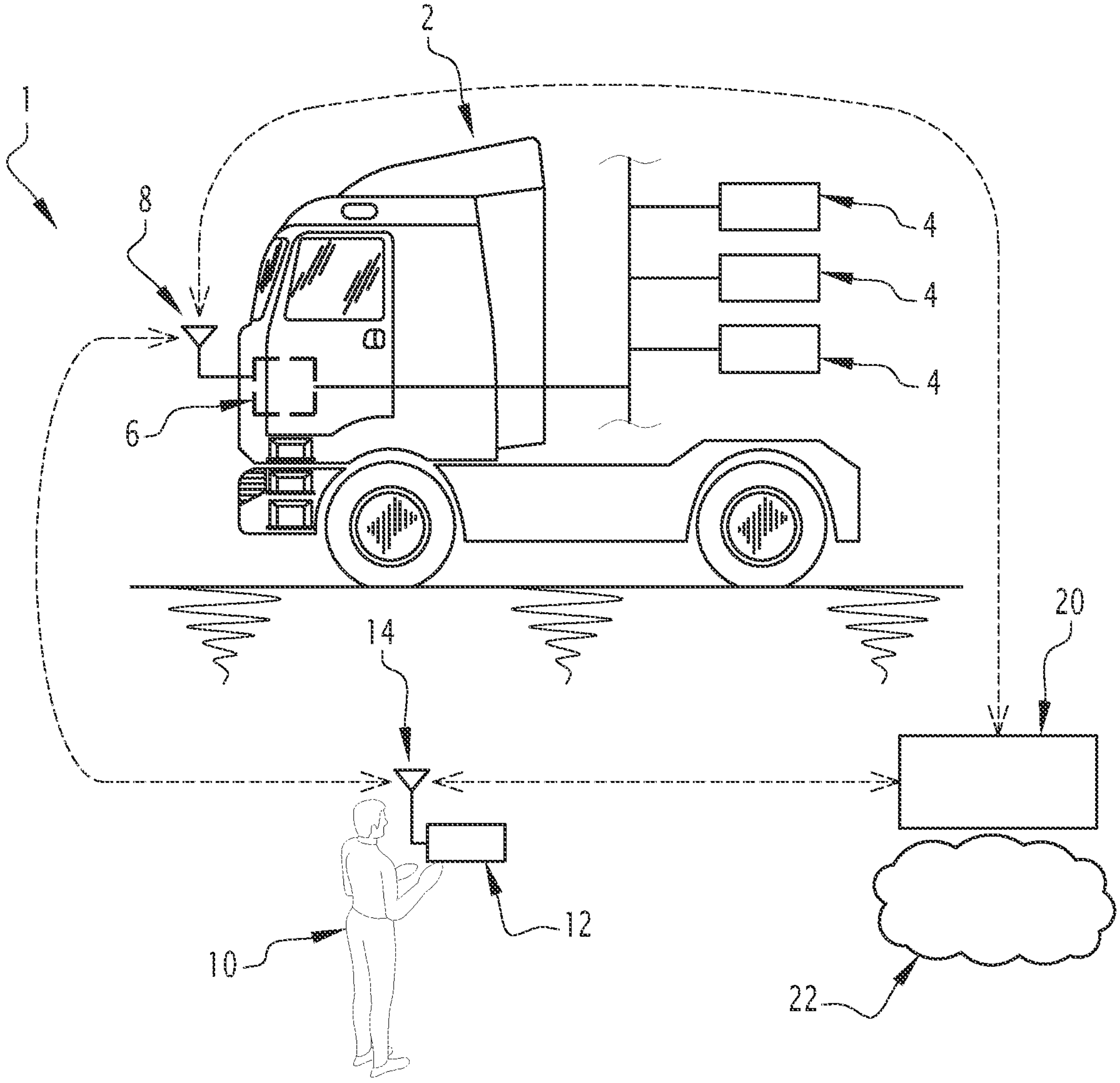
FIG. 1 is an exemplary system diagram of a system for inspecting a vehicle according to one example.
Figure 2:
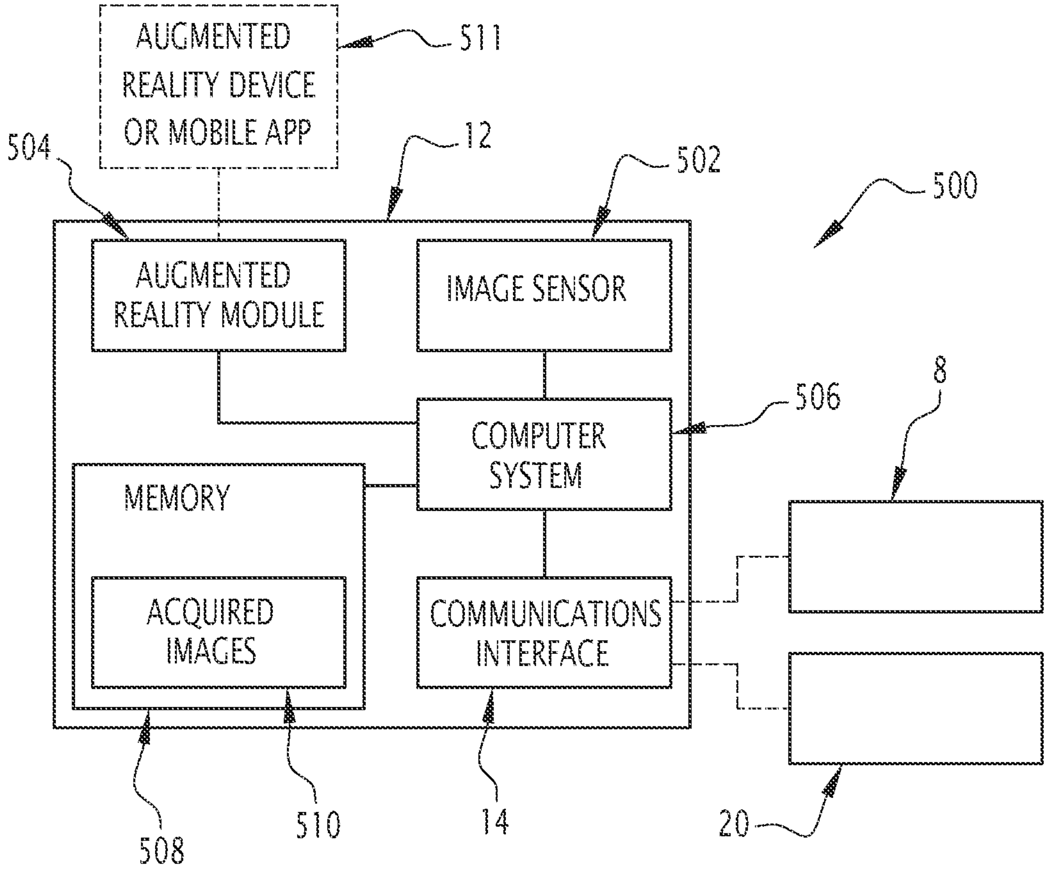
FIG. 2 is a block diagram illustrating a user terminal according to one example.

FIG. 1 is an exemplary system 1 according to one example.

The system 1 is associated with a vehicle 2. The system 1 is particularly suitable to perform an inspection of the vehicle 2, and preferably a pre-trip inspection of the vehicle 2, for example to determine whether the vehicle 2 is capable of performing a planned trip and/or to assess whether a maintenance operation is required.

In some examples, the vehicle 2 is an automotive vehicle, preferably a ground vehicle. The vehicle 2 may be a heavy-duty vehicle, such as a truck, although other examples are possible, such as buses, or construction equipment, or a cargo trailer, or more generally any industrial vehicle. The vehicle 2 comprises at least one testable component 4 and, preferably, a plurality of testable components 4. For example, the components 4 are parts of the vehicle 2 and/or subsystems of the vehicle 2. The components 4 may be electrical devices and/or mechanical devices and/or electro-mechanical devices. The components 4 may comprise electrical circuits and/or fluid circuits, such as oil circuits or compressed air circuits or water circuits. For example, the components 4 may be part of powertrain systems or subsystems, vehicle safety systems, passenger information and/or entertainment systems, vehicle communication systems, and so on.

Each component 4 may have an internal state that can be determined or estimated by testing said component 4 by an outside user and/or by measuring the state by a suitable sensor. In some examples, the internal state of a component 4 may be assessed visually. For example, a component 4 may be a light or a headlight of the vehicle 2. In this case, assessing the internal state of the component may then comprise determine whether the light is operating properly.

In another example, a component 4 may be a fluid tank (e.g. a windshield washer fluid tank of an oil tank or a water tank or a fuel tank). A gauge of the tank may be read from the outside of the tank. Alternatively, the tank may comprise transparent walls, allowing an outside user to determine visually the level of fluid comprised in the tank. In this case, assessing the internal state of the component may then comprise determining the amount of fluid in the tank or whether there is enough fluid in the tank for proper operation.

For example, in some examples, the components 4 may comprise lights or headlights, brakes (e.g., manual brake or automatic brake), a braking fluid circuit, a cooling system (e.g., a fan of a HVAC system), a windshield wiper system, a windshield cleaning system comprising a washer fluid circuit, a fuel tank; headlights, position lights, or any light signal, a fire extinguisher, an electric window motor, a horn, a vehicle alarm or anti-intrusion system, one or more tires, a powertrain transmission device (e.g., a gearbox), and/or an electrical battery, etc. The examples are not limited to this short list, which is provided only for illustrative purposes.

The components 4 may be visible from the outside of the vehicle 2 and/or accessible from inside the vehicle 2, for example from a driver's cabin or from a maintenance hatch. The internal state of a component 4 may depend on the nature of the equipment 4.

For example, the internal state may be a level of a fluid in a tank or in a closed circuit; the pressure of a fluid in a fluid line; a state of charge of an electrical battery; a wear level of a mechanical part or sub-system; a light irradiance value associated to a light source; and so forth. The internal state of a component 4 may be, in some examples, expressed as an indicator representative of whether the component 4 is working properly or not. In that case, the indicator may take one of two predefined values such as a first value (numerical or otherwise) indicating that the component 4 is not operating properly or has suffered a malfunction, and a second value indicating that the component 4 is operating properly or within a predefined operating range.

The vehicle 2 further comprises an electronic controller 6 and a communications interface 8 connected to the electronic controller 6.

The system 1 further comprises a user terminal 12. In the illustrated example, the user terminal 12 is capable of being operated by a user 10. The user terminal 12 comprises an augmented reality (AR) device 504 (comprising an AR display or being capable of delivering augmented reality images to a suitable display), at least one image sensor 502 such as a digital camera, a processor device such as a computer system 506 and a communications interface 14. The user terminal 12 also comprises a computer memory 508 capable of stored acquired images 510. For example, the user terminal 12 is a smartphone, or an electronic tablet, or a portable computer, or a computer workstation, or a virtual reality headset, or similar. The augmented reality (AR) display, may be implemented with a screen displaying an AR interface. In many embodiments, the AR interface may be provided by the terminal 12, e.g. through a dedicated VR device 511 in communication with the terminal 12, or by an AR software application 511 executed by a processor of the terminal 12.

The communication interface 14 is capable of establishing a short range communications link with the communications interface 8 of the vehicle 2, as represented by the dotted lines on the figure. The communications link may be established after pairing the communication interface 14 with the communications interface 8. For example, the short-range communications link is a Blutooth™ link, or a Bluetooth Low Energy™ (BLE) link, or an Ultra Wide Band (UWB) link, or a Wi-Fi link, or any link using suitable short-range radiofrequency (RF) communications technology. For example, the communications interface 14 comprises a radiofrequency antenna. For example, the communications interface 8 of the vehicle 2 comprises a radiofrequency antenna.

In preferred examples, the user terminal 12 is also capable of establishing a communications link with a remote computer 20, such as a computer server or an online cloud service. The communications link may be established through a communications network 22 such as internet, as will be made apparent in reference to FIG. 3. In some examples, the communications interface 8 of the electronic controller 6 is also capable of establishing a communications link with the remote computer 20.

Figure 3:
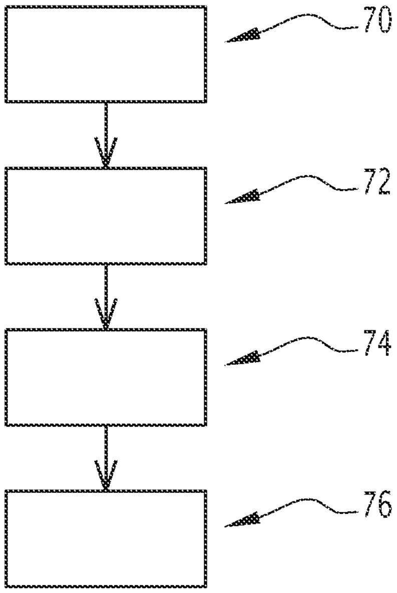
FIG. 3 is a flow chart of an exemplary method for inspecting a vehicle according to one example.

FIG. 3 is a flow chart of a method for inspecting the vehicle 2 according to one example.

In many examples, the method comprises:

- optionally, receiving, by a computing device comprising a processor, at least one image of a vehicle within a field of view of a camera in electronic communication with the computing device (block 70),
- determining, by the computing device, a location of the computing device relative to the vehicle (block 72),
- sending, by the computing device, a test request to an electronic controller of the vehicle to test operation of at least one vehicle component of the vehicle within the field of view of the camera of the computing device (block 74), and
- acquiring, by the computing device, a test result observed by the user in response to the automatic test of said at least one component of the vehicle (block 76).

Figure 4:
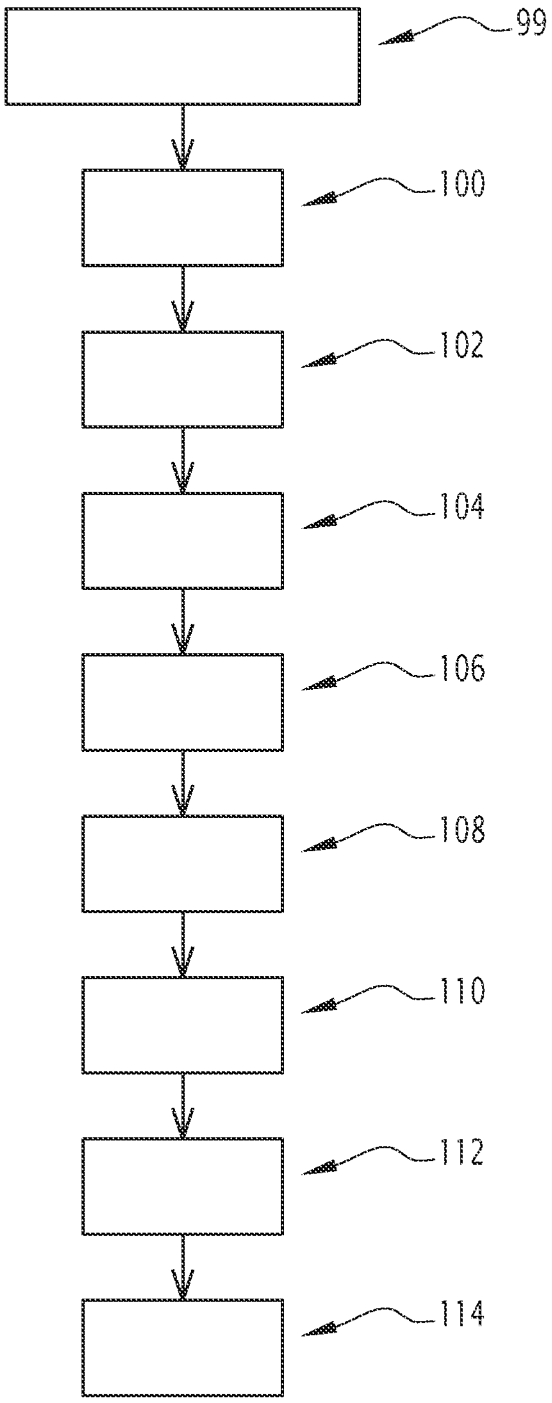
FIG. 4 is a flow chart of an exemplary method for inspecting a vehicle according to one example.

FIG. 4 is a more detailed flow chart of a method for inspecting the vehicle 2 according to one example.

The method comprises a first step (block 99) in which the inspection method is initiated, from the processor device of the user terminal 12, when the user terminal 12 is placed near the vehicle 2.

For example, the user terminal 12 is said to be placed "near" the vehicle 2 when the user terminal 12 is within a predefined range of the vehicle 2. The predefined range may be a predefined radius relative to a predefined position of the vehicle 2, such as the center of the vehicle 2 or the location of the communications interface 8.

For example, the user terminal 12 is said to be placed "near" the vehicle 2 when the user terminal 12 is within a radius equal to or lower than 5 meters of the vehicle 2, or a radius equal to or lower than 2 meters of the vehicle 2, or a radius equal to or lower than 1 meter of the vehicle 2.

The user terminal 12 may be placed "near" the vehicle 2 when the user terminal 12 is sufficiently close to the vehicle 2 so as to be able to establish a short range communications link with the communications interface 8 of the electronic controller 6.

During this initial step, the user terminal 12 may cause a short range communications link to be established with the communications interface 8.

During a subsequent step (block 100), images of the vehicle, such as a video, are acquired from the image sensor 502 of the user terminal. For example, the user may use the user terminal 12 to film the vehicle 2, e.g. by moving slowly around the vehicle 2.

Then, at block 102, the method comprises determining the user location relative to the vehicle 2. For example, the user location is determined using the acquired images and the short-range communications link established between the user terminal 12 and the vehicle 2 and using the short-range communications link established between the user terminal 12 and the vehicle 2, and more precisely, between the user terminal 12 and the communications interface 8.

This determination may be performed, in some examples, by the processor device of the user terminal 12. In alternative examples, the determination may be performed by the remote computer 20 and/or by the electronic controller 6 of the vehicle 2, provided that the images are forwarded, preferably in real time, to said computer 20 or controller 6.

For example, the user location may be determined by image analysis and optical recognition methods applied on the acquired images. For example, the acquired images are used to reconstruct a digital model of the vehicle using vehicle information stored in memory or acquired from the remote server 20.

A predefined three-dimensional (3D) digital model of the vehicle 2 may be used. This digital model may be stored in memory, for example in a memory of the terminal 12, or in a memory of a remote computer or online service (e.g. a cloud internet service) connected to the terminal 12 (such as the remote computer 20). A suitable 3D digital model corresponding to the actual type and/or class and/or model of the vehicle 2 may be chosen first, e.g. among a database of 3D digital models. The selection may be performed by the user, or by an automatic selection process in which the appropriate type or class or model of the vehicle is automatically recognized based on the first acquired pictures, e.g. using suitable known image recognition technologies, other embodiments being possible. Once a suitable 3D digital model of the vehicle 2 is acquired by the terminal 8, the digital images captured by the image sensor 502 are used in combination with the 3D digital model in order to derive location data, such as estimating a distance between the user (whose location may be considered to be identical to the position of the image sensor 502) and the vehicle 2, and/or identifying a specific face or region of the vehicle 2 in the field of view of the image sensor 502 or facing the image sensor 502, among other possibilities.

For example, the acquired images may be mapped onto the 3D digital model, using conventional and routine machine-based 3D reconstruction techniques, such as monocular reconstruction methods or stereo vision methods (e.g. if the camera comprises two or more image sensors). Then, distance and/or other location information may be derived using known methods such as photogrammetry, or image recognition methods.

It should be noted that, even though in the example given above the terminal 12 is tasked with determining the user location relative to the vehicle 2, the embodiments of the disclosure are by no means limited to this particular case. Instead, in alternative embodiments, determining the user location relative to the vehicle 2 may be performed by one or more systems connected to or operationally coupled to the terminal 12, such as the remote server 20.

During the step of determining the user location relative to the vehicle 2, vehicle information, such as the digital model may be displayed on the display of the user terminal 12, for example in conjuction with the acquired images.

Additionally, determining the position may comprise determining the distance (or the relative distance) between the communications interface 8 and the user terminal 12 and/or an orientation of the user terminal 12 relative to the communications interface 8 and/or the vehicle 2 itself. The determination may be carried out by analyzing one or more parameters of the communications link, such as received power level, transmit power level, link quality, received signal strength indication (RSSI), or any suitable RF parameter.

During a subsequent step (block 104), the method comprises activating a test sequence (104) to automatically test the operation of at least one testable component (4) of the vehicle (2), said testable component (4) being chosen based on the determined user location, e.g. by automatically selecting a testable component.

Figure 6:
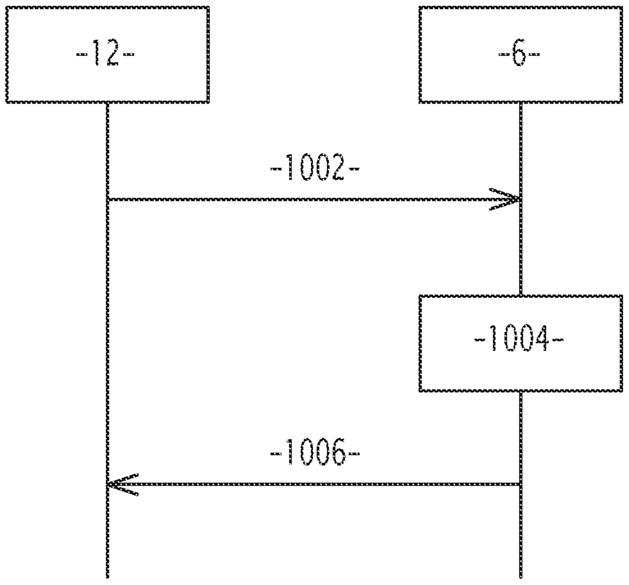
FIG. 6 is a diagram illustrating aspects of the communication between elements of the system of FIG. 1 according to one example.

For example, as illustrated on FIG. 6, a request is sent (step 1002) by the user terminal to the electronic controller 6 of the vehicle 2 to automatically test the operation of at least one testable component 4 of the vehicle 2, based on the determined user location. At block 1004, the electronic controller 6 initiates a test sequences and, preferably, sends an acknowledgement to the user terminal 12 (step 1006).

In what follows, the estimated position of the user 10 will be considered equivalent to the estimated position of the user terminal 12.

For example, choosing a testable component 4 of the vehicle based on the determined user location comprises choosing a testable component 4 closest to the estimated position of the user 10, or choosing a testable component placed on a portion of the vehicle facing the determined position of the user, for example a testable component placed in the field of vision of the image sensor.

For example, the position of the testable components 4 is recorded in the 3D digital model described above. A testable component 4 may be deemed to be the closest to the estimated position of the user 10 when the corresponding recorded position of the component 4 recorded in the 3D digital model is determined to be the closest to the estimated location of the user 10, based on the acquired images and/or based on parameters of the communications link between the terminal 12 and the electronic controller 6, as explained above. A testable component 4 may be deemed to be in the field of vision of the user 10 when the corresponding recorded position of the component 4 recorded in the 3D digital model is determined to be in the field of vision of the image sensor 502 of the user terminal 12, based on the acquired images.

In some embodiments, if several testable components 4 are available for selection in a same face of region of the vehicle 2 deemed closest to the user location, then the testable components 4 may be selected one after another, for example based on a predefined priority level (e.g. a component of critical importance, such as a headlights or safety devices, may be tested before a component of lesser importance), or based on a manual selection of the user (e.g. using an AR interface provided by the terminal 12, e.g. through a dedicated VR device or by an appropriate AR software application 511), or based on a random or pseudo-random selection, or alternatively through any possible selection means.

The steps may be repeated for successive testable components 4 as the user 10 moves around the vehicle 2 while imaging the vehicle 2 with the image sensor 502. For example, a predefined check-list may be recorded in memory of the terminal 12, said check-list comprising a list of the testable components 4 that must be tested. The method may stop once every component 4 that was listed to be tested has been effectively tested according to the method steps described above. In some embodiments, the user 10 may be prompted by the terminal 12, preferably through the AR interface, to move to specific positions and/or to acquire images of specific regions of the vehicle 2 in order to be able to activate the test sequence of specific testable components 4, such as components 4 that are present in the check-list and have not been tested yet. Other embodiments may be possible.

In a non-limiting example given for illustrative purposes, if a component 4 to be tested comprises headlights of the vehicle, then the headlights of the vehicle 2 may be automatically operated if the user 10 is detected in front on the vehicle 2.

In many examples, testing the operation of at least one component 4 of the vehicle comprises activating said component 4 of the vehicle according to a predefined test pattern.

In a non-limiting example given for illustrative purposes, if a component 4 to be tested comprises headlights of the vehicle, then testing the headlights may comprise flashing the headlights according to a predefined pattern, e.g. with a specific number of on-off cycles having a predefined duration and/or a specific duty cycle.

Other examples can be envisioned depending on the nature of each component 4 to be tested.

The method, or at least some steps thereof, may be repeated for inspecting different components 4.

In preferred examples, back to FIG. 4, the method may advantageously comprise comparing (block 108) the acquired test result with vehicle sensor data measured by at least one sensor of the vehicle, the sensor being coupled to the tested component of the vehicle, and generating an error code (block 110) if a discrepancy is detected between the acquired test result and the vehicle sensor data. If no discrepancy is detected, the no error may be generated.

For example, in some examples, the error code is a preset code on-board system diagnostic code, such as a Diagnostic Trouble Code (DTC), e.g. as defined by an on-board diagnosis system standard such as the OBD-II standard or the SAE-J1939 standard.

In some examples, initializing the method may comprise, once a communication link is established between the vehicle 2 and the user terminal 12, determining the vehicle type and retrieving vehicle information based on stored vehicle identification data, such as vehicle type, list of components of the vehicle, abilities of each component of the vehicle. The stored data may be stored in the remote service 20, in that case the user terminal may send one or more queries to the remote service 20.

In some examples, after generating an error code (block 110), the method further comprises generating a log report (block 112) for each inspection (e.g., for each instspected component 4). Then the method may further comprise comparing logged reports (block 114) to determine potential theft or damage to the vehicle 2, e.g. if the inspection fails for one or more components 4.

Figure 5:
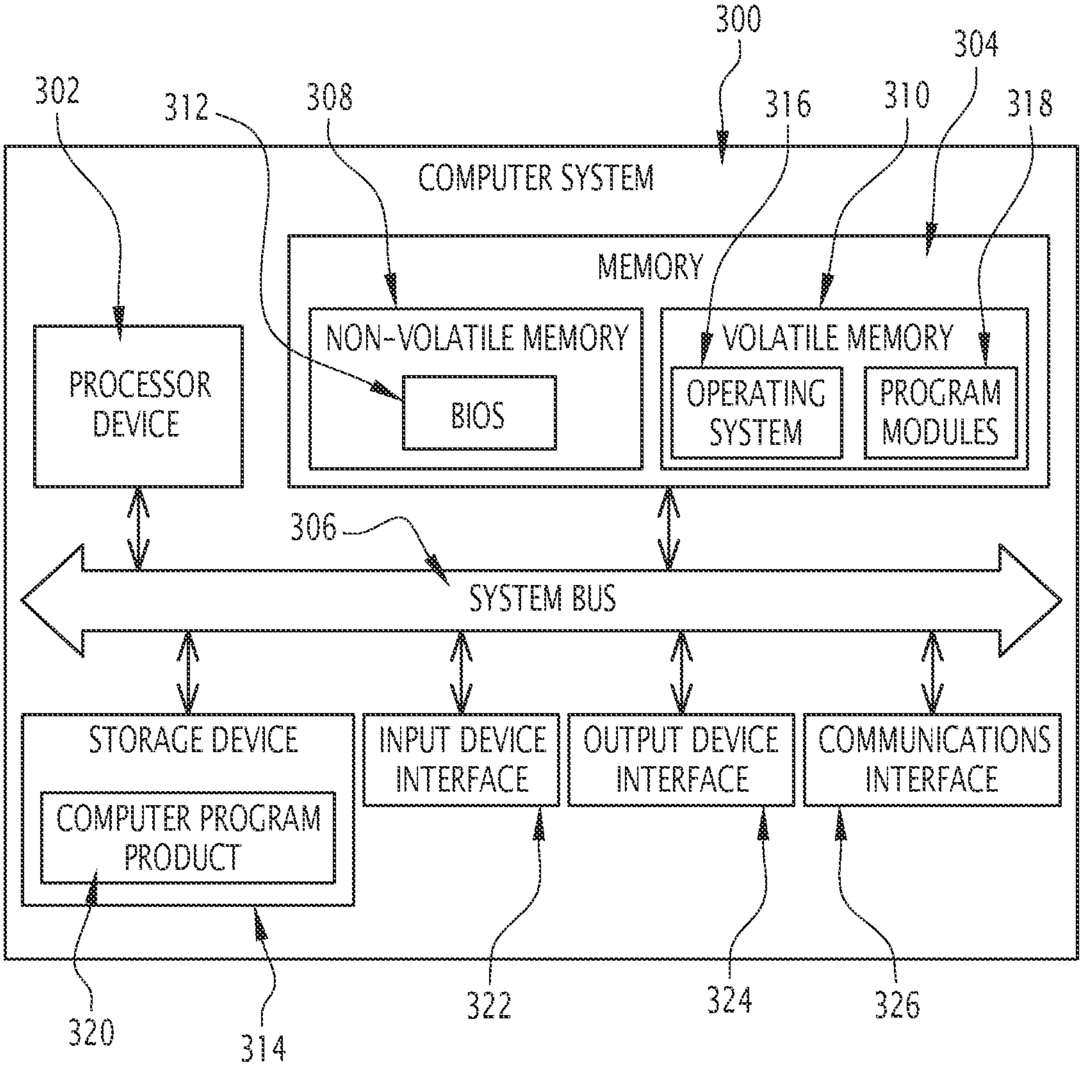
FIG. 5 is a schematic diagram of a computer system according to one example.

FIG. 5 is a schematic diagram of a computer system 300 for implementing examples disclosed herein. For example, the computer system 300 is provided as a generic example suitable for implementing the electronic controller 6 and/or the processor device of the user terminal 12.

The computer system 300 is adapted to execute instructions from a computer-readable medium to perform these and/or any of the functions or processing described herein. The computer system 300 may be connected (e.g., networked) to other machines in a LAN, an intranet, an extranet, or the Internet. While only a single device is illustrated, the computer system 300 may include any collection of devices that individually or jointly execute a set (or multiple sets) of instructions to perform any one or more of the methodologies discussed herein. Accordingly, any reference in the disclosure and/or claims to a computer system, computing device, control unit, electronic control unit (ECU), processor device, etc., includes reference to one or more such devices to individually or jointly execute a set (or multiple sets) of instructions to perform any one or more of the methodologies discussed herein. Further, such devices may communicate with each other or other devices by various system architectures, such as directly or via a Controller Area Network (CAN) bus, etc.

The computer system 300 may comprise any computing or electronic device capable of including firmware, hardware, and/or executing software instructions to implement the functionality described herein. The computer system 300 includes a processor device 302 (may also be referred to as a control unit), a memory 304, and a system bus 306. The system bus 306 provides an interface for system components including, but not limited to, the memory 304 and the processor device 302. The processor device 302 may include any number of hardware components for conducting data or signal processing or for executing computer code stored in memory 304. The processor device 302 (i.e., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 306 may be any of several types of bus structures that may further interconnect to a memory bus (with or without a memory controller), a peripheral bus, and/or a local bus using any of a variety of bus architectures. The memory 304 may be one or more devices for storing data and/or computer code for completing or facilitating methods described herein. The memory 304 may include database components, object code components, script components, or other types of information structure for supporting the various activities herein. Any distributed or local memory device may be utilized with the systems and methods of this description. The memory 304 may be communicably connected to the processor device 302 (e.g., via a circuit or any other wired, wireless, or network connection) and may include computer code for executing one or more processes described herein. The memory 304 may include non-volatile memory 308 (e.g., read-only memory (ROM), erasable programmable read-only memory (EPROM), electrically erasable programmable read-only memory (EEPROM), etc.), and volatile memory 310 (e.g., random-access memory (RAM)), or any other medium which can be used to carry or store desired program code in the form of machine-executable instructions or data structures and which can be accessed by a computer or other machine with a processor device 302. A basic input/output system (BIOS) 312 may be stored in the non-volatile memory 308 and can include the basic routines that help to transfer information between elements within the computing device 300.

The computing device 300 may further include or be coupled to a non-transitory computer-readable storage medium such as the storage device 314, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 314 and other drives associated with computer-readable media and computer-usable media may provide non-volatile storage of data, data structures, computer-executable instructions, and the like.

A number of modules can be stored in the storage device 314 and in the volatile memory 310, including an operating system 316 and one or more program modules 318, which may implement the functionality described herein in whole or in part. All or a portion of the examples disclosed herein may be implemented as a computer program product 320 stored on a transitory or non-transitory computer-usable or computer-readable storage medium (i.e., single medium or multiple media), such as the storage device 314, which includes complex programming instructions, such as complex computer-readable program code, to cause the processor device 302 to carry out the steps described herein. Thus, the computer-readable program code can comprise software instructions for implementing the functionality of the examples described herein when executed by the processor device 302. The processor device 302 may serve as a controller, or control system, for the computing device 300 that is to implement the functionality described herein.

The computer system 300 also may include an input device interface 322 (e.g., input device interface and/or output device interface). The input device interface 322 may be configured to receive input and selections to be communicated to the computer system 300 when executing instructions, such as from a keyboard, mouse, touch-sensitive surface, etc. Such input devices may be connected to the processor device 302 through the input device interface 322 coupled to the system bus 306 but can be connected through other interfaces such as a parallel port, an Institute of Electrical and Electronic Engineers (IEEE) 1394 serial port, a Universal Serial Bus (USB) port, an IR interface, and the like. The computer system 300 may include an output device interface 324 configured to forward output, such as to a display, a video display unit (e.g., a liquid crystal display (LCD) or a cathode ray tube (CRT)). The computing device 300 may also include a communications interface 326 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A method for inspecting a vehicle, the method comprising:

determining, by a processor device of a user terminal operable by a user, a location of the user relative to the vehicle;

sending, by the user terminal, a test request to an electronic controller of the vehicle to automatically test operation of at least one vehicle component of the vehicle within a field of view of an image sensor of the user terminal; and acquiring, by the user terminal, a test result observed by the user in response to the requested automatic test of the at least one component of the vehicle.

2. The method of claim 1, further comprising:

comparing the acquired test result with vehicle sensor data measured by at least one sensor of the vehicle, the at least one sensor being coupled to the tested component of the vehicle; and generating an error code if a discrepancy is detected between the acquired test result and the vehicle sensor data.

3. The method of claim 2, wherein the error code is a preset Diagnostic Trouble Code (DTC).

4. The method of claim 1, wherein testing the operation of the at least one component of the vehicle comprises activating the at least one component of the vehicle according to a predefined test pattern.

5. The method of claim 1, wherein the method further comprises, for choosing a testable component of the vehicle, determining a vehicle type and vehicle information based on images acquired by the image sensor and based on stored vehicle identification data.

6. The method of claim 1, wherein the method further comprises generating a log report for each test result.

7. The method of claim 6, wherein the method further comprises comparing logged reports to determine potential theft or damage to the vehicle.

8. The method of claim 1, wherein the vehicle is an industrial vehicle.

9. The method of claim 1, wherein the method further comprises acquiring, at least one image of the vehicle within a field of view of the image sensor of the user terminal.

10. The method of claim 5, wherein the stored vehicle identification data comprises one or more of a vehicle type, a list of components of the vehicle, and abilities of each component of the vehicle.

11. The method of claim 8, wherein the industrial vehicle is a truck or a cargo trailer.

12. A computer program product comprising a non-transitory computer readable medium having stored thereon a computer program comprising instructions for performing, when executed by a processor device, the method of claim 1.

13. A system for inspecting a vehicle, the system comprising:

a user terminal operable by a user and comprising a processor device, an image sensor, and a communications interface capable of establishing a short-range communications link with a communications interface of an electronic controller of the vehicle, the user terminal being configured to:

determine, by the processor device, a location of the user relative to the vehicle;

send, by the user terminal, a test request to an electronic controller of the vehicle to automatically test operation of at least one vehicle component of the vehicle within a field of view of the image sensor of the user terminal; and acquire, by the user terminal, a test result observed by the user in response to the requested automatic test of the at least one component of the vehicle.

* * * * *